(12) United States Patent
Levant et al.

(10) Patent No.: US 11,321,835 B2
(45) Date of Patent: May 3, 2022

(54) DETERMINING THREE DIMENSIONAL INFORMATION

(71) Applicant: APPLIED MATERIALS ISRAEL LTD., Rehovot (IL)

(72) Inventors: Anna Levant, Rehovot (IL); Rafael Bistritzer, Petach Tikva (IL)

(73) Assignee: APPLIED MATERIALS ISRAEL LTD., Rehovot (IL)

(*) Notice: Subject to any disclaimer, the term of this patent is extended or adjusted under 35 U.S.C. 154(b) by 0 days.

(21) Appl. No.: 16/821,831

(22) Filed: Mar. 17, 2020

(65) Prior Publication Data
US 2021/0295499 A1 Sep. 23, 2021

(51) Int. Cl.
*G06K 9/62* (2022.01)
*G06T 7/00* (2017.01)

(52) U.S. Cl.
CPC .......... *G06T 7/0012* (2013.01); *G06K 9/6267* (2013.01); *G06T 2207/10061* (2013.01); *G06T 2207/20081* (2013.01); *G06T 2207/30148* (2013.01)

(58) Field of Classification Search
CPC .......... G06T 15/00; G06T 17/00; G06T 19/00
See application file for complete search history.

(56) References Cited

U.S. PATENT DOCUMENTS

| | | | |
|---|---|---|---|
| 5,887,080 A * | 3/1999 | Tsubusaki | G06T 7/11 382/172 |
| 6,111,981 A * | 8/2000 | Tsubusaki | G06V 20/695 382/256 |
| 6,246,787 B1 * | 6/2001 | Hennessey | G01N 21/95607 382/141 |
| 6,363,167 B1 * | 3/2002 | Miyano | G06T 7/62 382/209 |
| 6,483,938 B1 * | 11/2002 | Hennessey | H01L 22/20 382/218 |
| 6,670,610 B2 | 12/2003 | Shemesh et al. | |
| 7,764,824 B2 * | 7/2010 | Karsenti | G06T 7/001 382/145 |
| 8,005,562 B2 * | 8/2011 | Baek | H01J 37/32935 700/121 |
| 8,013,301 B2 * | 9/2011 | Tam | G06T 7/0006 382/199 |
| 8,098,926 B2 * | 1/2012 | Schwarzband | G06T 7/66 382/209 |
| 8,227,265 B2 * | 7/2012 | Nemoto | H01L 22/12 356/612 |
| 8,709,269 B2 | 4/2014 | Shemesh | |
| 8,762,379 B2 * | 6/2014 | Birdwell | G06K 9/6224 707/737 |
| 8,995,748 B2 * | 3/2015 | Sakai | G06T 7/30 382/149 |
| 10,943,762 B2 * | 3/2021 | Ohashi | G06T 7/0004 |
| 10,991,078 B2 * | 4/2021 | Hakimuddin | G06N 3/088 |
| 2009/0296073 A1 | 12/2009 | Wagganer | |
| 2011/0020956 A1 * | 1/2011 | Nemoto | H01L 22/12 356/612 |

(Continued)

*Primary Examiner* — Tsung Yin Tsai
(74) *Attorney, Agent, or Firm* — Kilpatrick Townsend & Stockton LLP

(57) ABSTRACT

A method, a non-transitory computer readable medium and a system for determining three dimensional (3D) information of structural elements of a substrate.

19 Claims, 6 Drawing Sheets

(56) References Cited

U.S. PATENT DOCUMENTS

| | | | |
|---|---|---|---|
| 2012/0141011 A1* | 6/2012 | Sakai | G01N 21/9501 |
| | | | 382/149 |
| 2019/0072496 A1* | 3/2019 | Barbu | G03F 7/705 |
| 2019/0087939 A1* | 3/2019 | Hakimuddin | G06V 10/40 |
| 2019/0244783 A1* | 8/2019 | Ohashi | H01J 37/28 |
| 2019/0310554 A1* | 10/2019 | Middlebrooks | G03F 7/705 |
| 2020/0027021 A1* | 1/2020 | Sastry | G06N 3/08 |
| 2020/0051777 A1 | 2/2020 | Shneyour et al. | |
| 2021/0035277 A1* | 2/2021 | Ishikawa | G06T 7/001 |

\* cited by examiner

DETERMINING THREE DIMENSIONAL INFORMATION

BACKGROUND OF THE INVENTION

Three dimensional (3D) metrology is a new field in the semiconductor industry. Shrinkage of planar devices has reached its physical limit and advanced nodes resort to 3D design to increase the feature density in the device. Reliable measurements of these 3D structures are crucial for their development process.

Currently, optical critical dimension (OCD) grabs the lion's share of 3D non-destructive measurements. However, OCD is limited to measurements on specially designed periphery targets and cannot make in-die measurements. Moreover, OCD has low spatial resolution (order of 50 μm), can only measure periodic structures, is sensitive to under layer and involves a complex and time-consuming recipe setup.

There is a growing need to provide accurate methods for determining 3D information of structural features of substrates.

BRIEF SUMMARY OF THE INVENTION

There may be provided a method, a non-transitory computer readable medium and a system for determining 3D information.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

Figure 1:
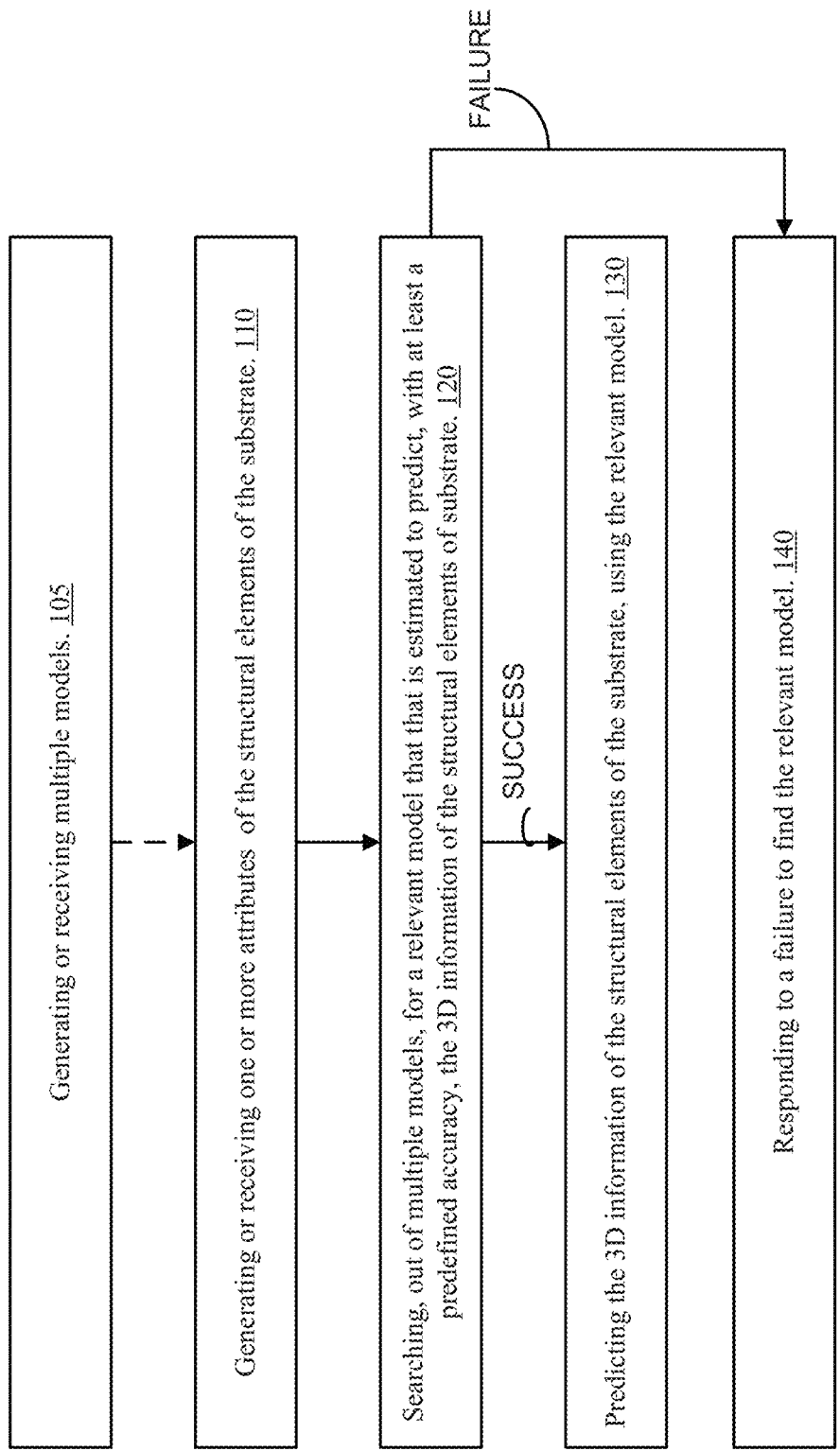
FIG. 1 illustrates an example of a method.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

A structural element means a nanometric scale structural element such as but not limited to a transistor, a part of a transistor, a memory cell, a part of a memory cell, an arrangement of conductors, an arrangement of insulators, and the like.

There may be provided a system, a method and a non-transitory computer readable medium for determining three dimensional (3D) information of structural elements of a substrate.

It should be noted that the system, the method, and the non-transitory computer readable medium may be applied, mutatis mutandis, to determine information other than 3D information related to structural elements of a substrate. The information other than the 3D information may be information that cannot be directly and accurately determined from SEM images.

The substrate may be a wafer, a MEMS substrate, a solar panel, and the like.

In various examples it will be assumed, for simplicity of explanation, that the substrate is a wafer.

FIG. 1 illustrates method 100 for determining 3D information of structural elements of a substrate.

Method 100 may start by step 105 of generating or receiving multiple models. The multiple models are generated during a training process. A model may represent a relationship between one of more SEM images of a structural element and 3D information regarding the structural element.

Step 105 may include at least one out of:
Classifying the different training substrates by applying a classification process, and generating a model for each class.
Classifying the different training substrates based on the estimated accuracy of prediction of the different models.
Classifying the different training substrates based on information regarding the process parameters of the different wafers.

Step 105 may be followed by step 110 of generating or receiving one or more attributes of the structural elements of the substrate.

The one or more attributes are determined based on the SEM images of the structural elements.

Accordingly, step 110 may include generating the one or more attributes of the structural elements. Additionally or alternatively—step 110 may include receiving the one or more attributes of the structural elements.

Step 110 may include compensating for SEM image acquisition process limitations. For example, compensating for relatively low signal to noise ratio of a single SEM image.

An attribute of the structural elements of the substrate may represents information regarding a group of structural elements of the substrate. For example, the attribute may be calculated per die.

The group of structural elements may include all or only some of the structural elements of a single die of the substrate. The one or more attributes may be generated based on a model and/or based on a machine learning technique.

The group of structural elements may include all or only some of the structural elements of the substrate.

The group of structural elements may include all structural elements that are represented by a same 3D information unit.

The group of structural elements may be multiple instances of the same structural element.

Step 110 may be followed by step 120 of searching, out of multiple models, for a relevant model that is estimated to predict, with at least a predefined accuracy, the 3D information of the structural elements of substrate.

The predefined accuracy may be determined by a manufacturer of the substrate, by an operator of a metrology system, and/or in any manner.

The models may be generated by applying machine learning.

At least some of the models may be generated during a training process. The training process may include receiving or generating one or more attributes of structural elements of training substrates and also receiving or generating 3D information regarding at least some of the structural elements of the training substrates.

The 3D information may be provided in various manners—for example by milling a die and obtaining transmissive electron microscope (TEM) images of the milled die.

The models may be generated, during the training process, based on (a) the one or more attributes of structural elements of training substrates, and (b) the 3D information regarding at least some of the structural elements of the training substrates.

The different models may represent different classes of training substrates. The classes may be determined based on the accuracy of prediction obtained by using the different models.

A model may be associated with a class of one or more training substrates.

A model should predict, with at least the predefined accuracy, the 3D information regarding to a substrate that belongs to a class of training substrates associated with the model.

Accordingly, a model associated with a certain class may fail to predict, with the at least the predefined accuracy, the 3D information regarding to a substrate that is not associated with the certain class.

The prediction accuracy of a model, in relation to a certain substrate, may be determined based on the relationship between (a) one or more attributes of the structural elements of the certain substrate, and (b) one or more attributes of structural elements of a training substrate associated with the model.

The searching for the relevant model may be a matching process that examines the relationships between (a) one or more attributes of the structural elements of the certain substrate, and (b) one or more attributes of structural elements of a training substrate associated with the model.

The relationships may be, for example, similarity between the one or more attributes, and the like.

If the similarity is lower than a predefined threshold then the prediction accuracy of the model may be deemed to be inadequate.

Various matching processes may be applied such as sums-squared difference search (SD), calculation of Mahalanobis distance, KL-divergence, or any other regressions processes.

Using different models for different classes increases the accuracy of the method and was found to overcome problems such as model overlapping and multi-modality. Model overlapping occurs when different substrates of similar one or more attributes are mapped to different values of 3D information. Multi-modality occurs when occurs when different substrates of different one or more attributes are mapped to same values of 3D information.

The searching (step 120) may have several outcomes.

A first outcome is finding the relevant model. If multiple relevant models are found then one of the found relevant models may be selected.

The first outcome leads to step 130 of predicting the 3D information of the structural elements of the substrate, using the relevant model.

A second outcome is failing to find a relevant model. In this case it is assumed that neither one of the multiple relevant models can accurately predict (predict with the at least the predefined accuracy) the 3D information of the structural elements of the substrate.

The second outcome leads to step 140 of responding to a failure to find the relevant model.

Step 140 may include at least one out of:
Preventing from predicting the 3D information of the structural elements of the substrate.
Predicting the 3D information of the structural elements of the substrate but assigning a low certainty level to the prediction.
Calculating a new model based on the substrate. This will require obtaining 3D information of the substrate.
Requesting to calculate a new model based on the substrate.
Generating a failure indication.

Figure 2:
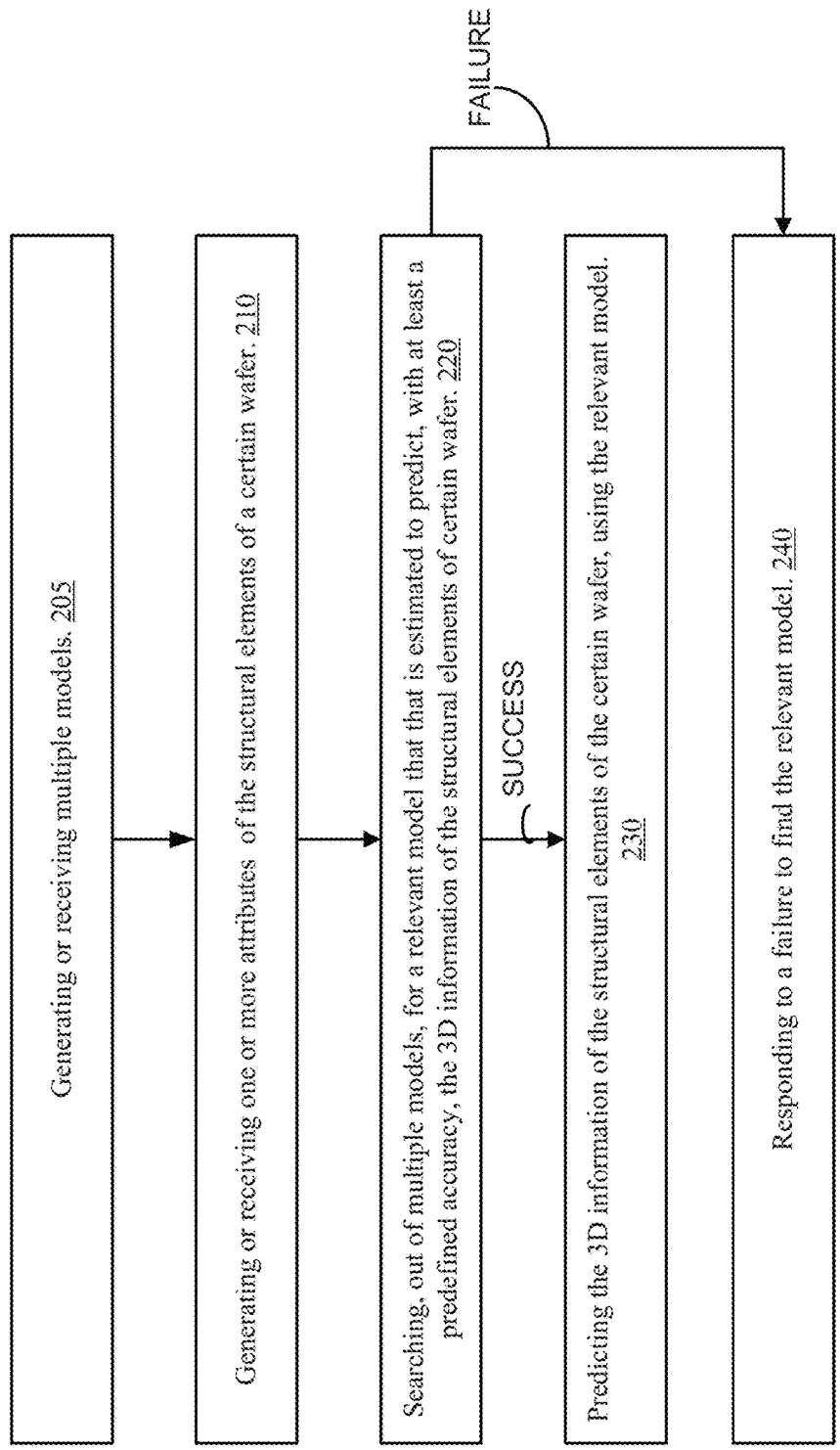
FIG. 2 illustrates an example of a method.

FIG. 2 illustrates an example of method 200.
It is assumed that:
The training substrates are training wafers.
Each training wafer includes a set of dies.

Per wafer, a first set of dies is provided with 3D information and a second set of dies is provided without 3D information.

Each die of the first set of dies is represented by a 3D information unit.

An attribute of the structural elements of the substrate represent the structural elements of the entire die.

Under these assumptions, the model associated with a training wafer is generated based on the one or more attributes and the 3D information regarding the first set of dies. During a training step the attributed may be determined. The attributes (at least some) and known 3D information (ground state) values and optionally any process information are used to generate the multiple models. The train step involves determining the attributes themselves and using all of them, from all train substrates (wafers).

During the test or inference step the attributes of the tested wafer are used to find the relevant model. If such a relevant model if found it may be fed with the attributes (all or a subset) of the specific structure to the relevant model.

The searching of a relevant model may be based on one or more attributes related to the entire wafer.

Method 200 may start by step 205 of generating or receiving multiple models. The multiple models are generated during a training process.

Step 205 may be followed by step 210 of generating or receiving one or more attributes of the structural elements of a certain wafer.

Step 210 may be followed by step 220 of searching, out of multiple models, for a relevant model that is estimated to predict, with at least a predefined accuracy, the 3D information of the structural elements of the certain wafer.

Step 220 may include determining the relationship between (a) the one or more attributes of the structural elements of a certain wafer, and (b) the one or more attributes of structural elements of test wafers associated with different classes of training wafers.

The relationship may represent similarities between the (a) the one or more attributes of the structural elements of a certain wafer, and (b) the one or more attributes of structural elements of test wafers associated with different classes of training wafers.

If, for a certain class the similarity is higher than a predefined similarity threshold—then the model associated with the certain class can be regarded to be the relevant model.

When finding the relevant model, then step 220 is followed by step 230 of predicting the 3D information of the structural elements of the certain wafer, using the relevant model.

Else—step 220 is followed by step 240 of responding to a failure.

Figure 3:
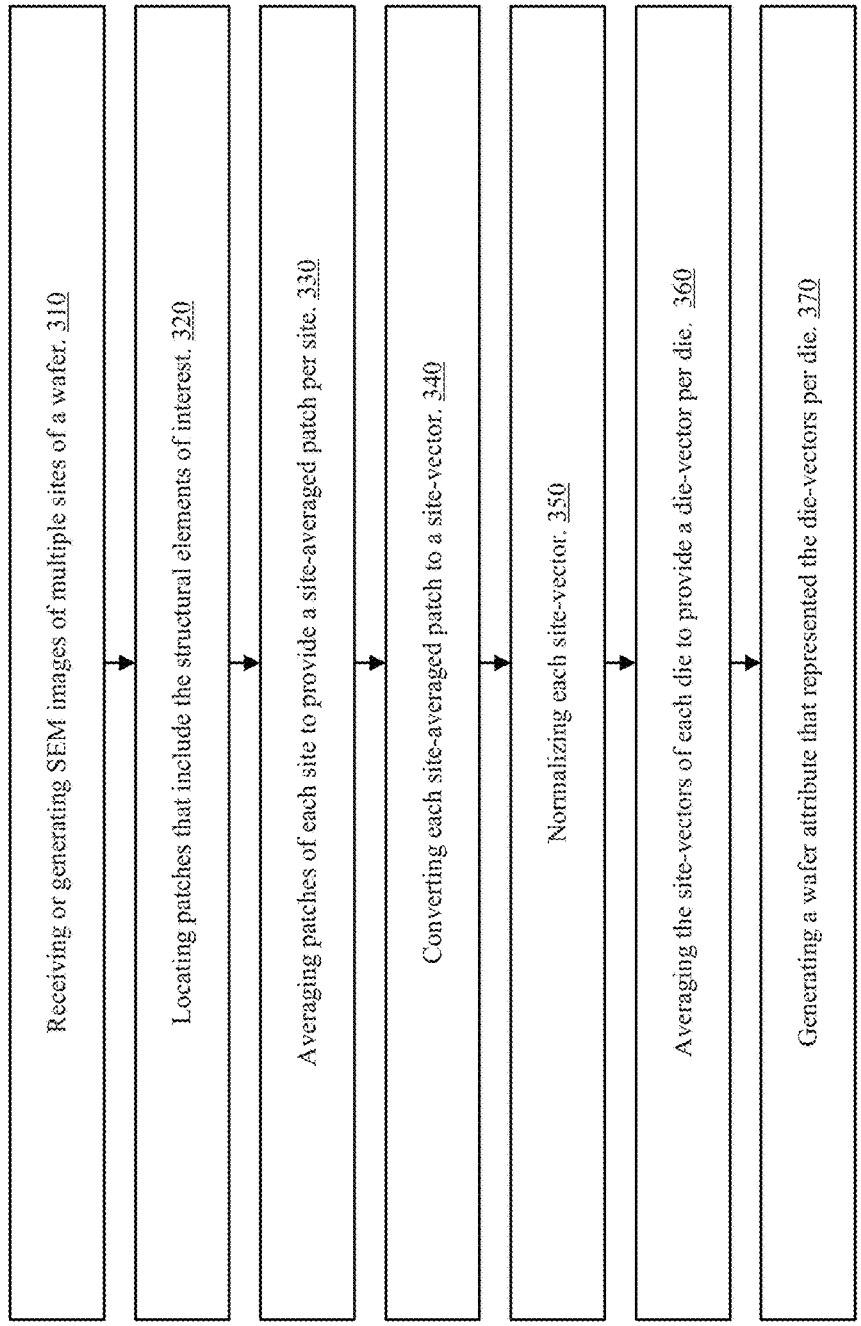
FIG. 3 illustrates an example of a method.

FIG. 3 illustrates a method 300 for generating one or more attributes of structural elements of a die.

Method 300 illustrate various steps that increase the signal to noise of SEM images, and compensate for possible SEM imaging induced changes (such as intensity of electron beam illuminating the site, or other changes during the illumination and/or collection of electrons) between SEM images of different sites. Other steps may be provided.

Method 300 may start by step 310 of receiving or generating SEM images of multiple sites of a wafer. The multiple sites may cover the entire wafer or may cover only one or more parts of the wafer.

Step 310 may be followed by step 320 of locating patches that include the structural elements of interest, especially locating patches in the SEM images that include multiple instances of certain structural elements. A patch may be a two-dimensional patch.

Step 320 may be followed by step 330 of averaging patches of each site to provide a site-averaged patch per site.

Step 330 may be followed by step 340 of converting each site-averaged patch to a site-vector. This can be done, for example, by averaging each pixel column of the site-averaged patch to provide a site-vector element per column.

Step 340 may be followed by step 350 of normalizing each site-vector.

Step 350 may be followed by step 360 of averaging the site-vectors of each die to provide a die-vector per die.

Step 360 may be followed by step 370 of generating a wafer attribute that represented the die-vectors per die. The wafer attribute may be a matrix.

Figure 4:
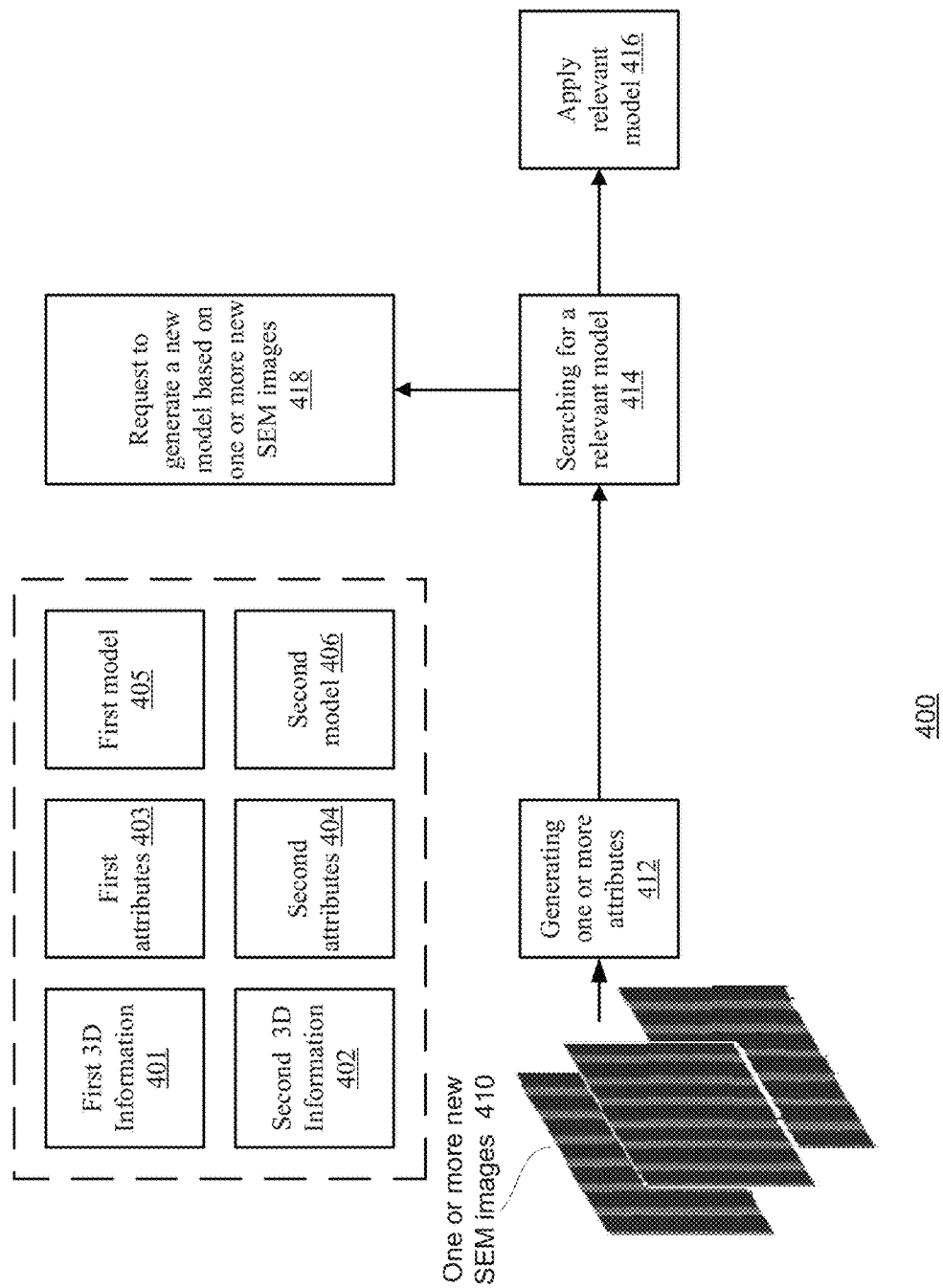
FIG. 4 illustrates an example of a method and various scanning electron microscope (SEM) images, and data structures.

FIG. 4 illustrates an example of a method 400, and various SEM images and data structures.

It is assumed (for convenience of explanation only) that there are two classes of training wafers and two training modules: a first model 405 and a second model 406. The first class of training wafers is represented by first 3D information 401 and first attributes 403. The second class of training wafers is represented by second 3D information 402 and second attributes 404. There may be more than two classes.

One or more new SEM images 410 of a new wafer are received.

The one or more SEM images are processed by generating one or more attributes 412. The generated one or more attributes are sent to a step 414 of searching for a relevant model. If succeeding—step 414 is followed by step 416 of applying the relevant model (which may be the first model or the second model)—for generating the 3D information of the new wafer. Else, step 414 is followed by step 418 of requesting to generate a new model based on the one or more SEM images and 3D information.

Figure 5:
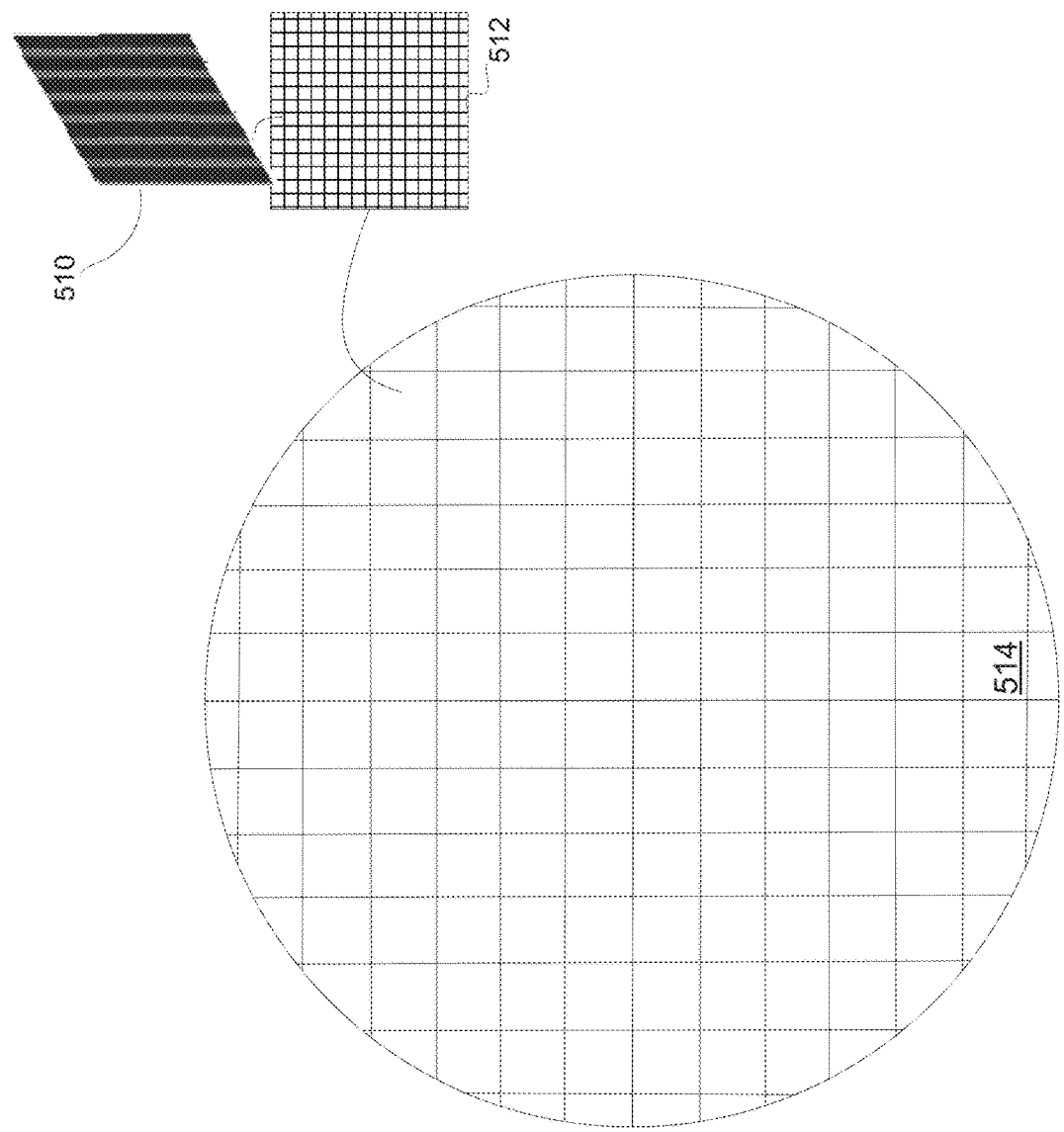
FIG. 5 illustrates an example of a wafer, a die and a SEM image.

FIG. 5 illustrates an example of a wafer 514, a die 512 and a SEM image 510 of one of the sites of a die.

Figure 6:
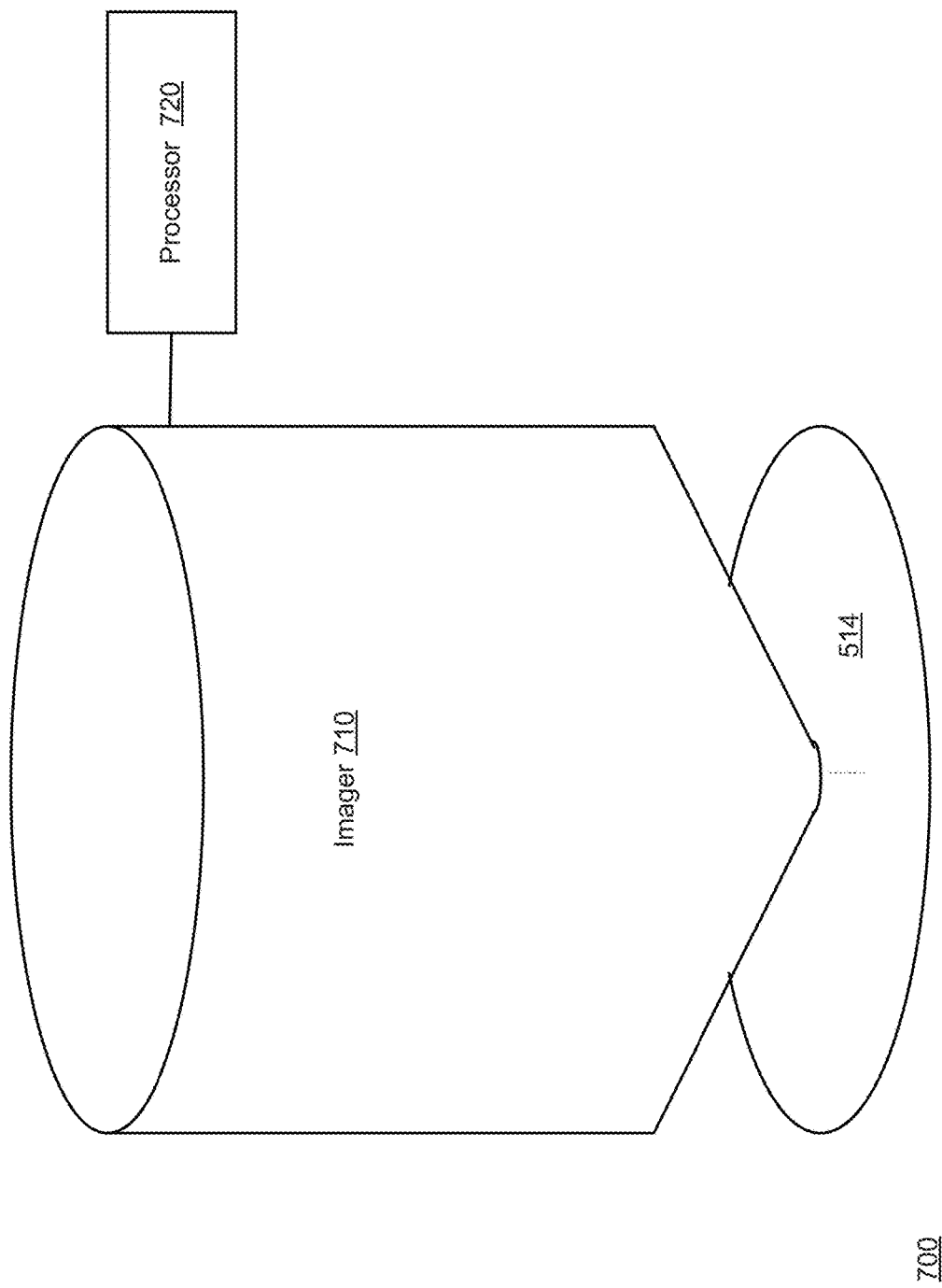
FIG. 6 illustrates an example of a wafer, and a system.

FIG. 6 illustrates a wafer 514 and a system 500 that includes an imager 710 and a processor 720.

The processor may include one or more processing circuits such as microprocessors, graphic processing units, hardware accelerators, central processing units, neural network processors, image processors, and the like. The processor may be programmed (or otherwise constructed and arranged to or configured to) execute any step of any of the method illustrated in the specification.

The system may also include a memory unit such as a volatile or non-volatile memory unit, for storing information, and/or instructions and/or models and/or one or more attributes. The memory unit is an example of a non-transitory computer readable medium.

The imager 710 may be an electron beam imager, an electron beam microscope, an ion microscope, an ion imager, and the like. The electron beam microscope can be a scanning electron microscope, a transmission electron microscope, and the like.

System 700 may be configured to execute at least one of method 100, 200, 400 and 400.

The imager is configured to generate SEM images while the processor 200 may be configured to perform other steps of at least one of method 100, 200, 400 and 400.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The embodiment may also be implemented in a computer program for running on a computer system, at least including code portions for performing steps of a method according to the embodiment when run on a programmable apparatus, such as a computer system or enabling a programmable apparatus to perform functions of a device or system according to the embodiment. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CDROM, CDR, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

The foregoing specification, includes specific examples of one or more embodiments. It will, however, be evident that various modifications and changes may be made therein without departing from the broader spirit and scope of the one or more embodiments as set forth in the appended claims.

What is claimed is:

1. A method for determining three dimensional (3D) information of structural elements of substrate, the method comprising:
   storing a plurality of different models that can be used to predict 3D information of structural elements of a plurality of different classes of substrates, wherein each model in the plurality of different models is generated with machine learning during a training process in which a plurality of different training substrates are classified into different classes of substrates based on information regarding process parameters of the training substrates, and wherein each model in the plurality of different models can predict, with a first predefined accuracy, 3D information regarding a substrate that belongs to a different class of substrates than the classes that the other models in the plurality of different models can predict;

generating or receiving a first set of one or more attributes of the structural elements of the substrate, wherein the one or more attributes are determined based on scanning electron microscope (SEM) images of the structural elements;

searching, based on a second set of one or more attributes that can be different from the first set of one or more attributes, the plurality of different models for a relevant model that is estimated to predict, with at least a second predefined accuracy, the 3D information of the structural elements of substrate;

if the searching identifies a relevant model, predicting the 3D information of the structural elements of substrate using the identified relevant model and the first set of one or more attributes of the structural elements; and if the searching does not identify a relevant model, responding to a failure to find a relevant model.

2. The method according to claim 1 wherein the responding to the failure comprises calculating a new model based on the substrate.

3. The method according to claim 1 wherein different models represent different classes of training substrates.

4. The method according to claim 3 comprising classifying the different training substrates by applying a classification process.

5. The method according to claim 3 wherein the classifying is based, at least in part, on manufacturing information related to the different training substrates.

6. The method according to claim 1 wherein a certain model represents a certain class of training substrates that are mutually predictable.

7. The method according to claim 6 comprising verifying an inclusion of the training substrates in the certain class of the training substrates.

8. The method according to claim 1 wherein the searching comprises determining an accuracy of prediction of at least some of the multiple models based on a relationship between (a) the one or more attributes of the structural elements of the substrate, and (b) one or more attributes associated with each model of the at least some of the multiple models.

9. The method according to claim 1 wherein the searching comprises determining a confidence level of a prediction related to each of the models.

10. The method according to claim 1 wherein the one or more attributes of the structural elements of the substrate are generated by compensating for differences in an acquisition of SEM images of different sites of the structural elements of the substrate.

11. The method according to claim 1 wherein an attribute of the structural elements of the substrate represents information regarding a group of structural elements of the substrate.

12. The method according to claim 11 wherein the group of structural elements of the substrate belongs to a single die of the substrate.

13. The method according to claim 1 wherein the one or more attributes are determined based, at least in part, on information regarding a manufacturing process of the substrate.

14. The method according to claim 1 wherein the first set of one or more attributes is limited to attributes of the structural elements of the substrate while the second set of one or more attributes can include one or more attributes related to the entire substrate.

15. A non-transitory computer readable medium for determining three dimensional (3D) information of structural elements of substrate, the non-transitory computer readable medium stores instructions for:

storing a plurality of different models that can be used to predict 3D information of structural elements of a plurality of different classes of substrates, wherein each model in the plurality of different models is generated with machine learning during a training process in which a plurality of different training substrates are classified into different classes of substrates based on information regarding process parameters of the training substrates, and wherein each model in the plurality of different models can predict, with a first predefined accuracy, 3D information regarding a substrate that belongs to a different class of substrates than the classes that the other models in the plurality of different models can predict;

generating or receiving a first set of one or more attributes of the structural elements of the substrate, wherein the one or more attributes are determined based on scanning electron microscope (SEM) images of the structural elements;

searching, based on a second set of one or more attributes that can be different from the first set of one or more attributes, the plurality of different for a relevant model that is estimated to predict, with at least a second predefined accuracy, the 3D information of the structural elements of substrate;

if the searching identifies a relevant model, predicting the 3D information of the structural elements of substrate using the identified relevant model and the first set of one or more attributes of the structural elements; and if the searching does not identify a relevant model, responding to a failure to find a relevant model.

16. The non-transitory computer-readable memory according to claim 15 wherein the first set of one or more attributes is limited to attributes of the structural elements of the substrate while the second set of one or more attributes can include one or more attributes related to the entire substrate.

17. A system for determining three dimensional (3D) information of structural elements of substrate, the system comprises a processor configured to:

store a plurality of different models that can be used to predict 3D information of structural elements of a plurality of different classes of substrates, wherein each model in the plurality of different models is generated with machine learning during a training process in which a plurality of different training substrates are classified into different classes of substrates based on information regarding process parameters of the training substrates, and wherein each model in the plurality of different models can predict, with a first predefined accuracy, 3D information regarding a substrate that belongs to a different class of substrates than the classes that the other models in the plurality of different models can predict;

generate or receive a first set of one or more attributes of the structural elements of the substrate, wherein the one or more attributes are determined based on scanning electron microscope (SEM) images of the structural elements;

search, based a second set of one or more attributes that can be different from the first set of one or more attributes, the plurality of different models for a relevant model that is estimated to predict, with at least a second predefined accuracy, the 3D information of the structural elements of substrate;

if the searching identifies a relevant model, predict the 3D information of the structural elements of substrate using the identified relevant model and the first set of one or more attributes of the structural elements; and if the searching does not identify a relevant model, respond to a failure to find a relevant model.

18. The system according to claim 17 wherein the system comprises an imager that is configured to acquire the SEM images.

19. The system according to claim 17 wherein the first set of one or more attributes is limited to attributes of the structural elements of the substrate while the second set of one or more attributes can include one or more attributes related to the entire substrate.

* * * * *